Feb. 8, 1966   J. E. HIERS ETAL   3,233,626
PRESSURE CONTROL
Filed April 30, 1964
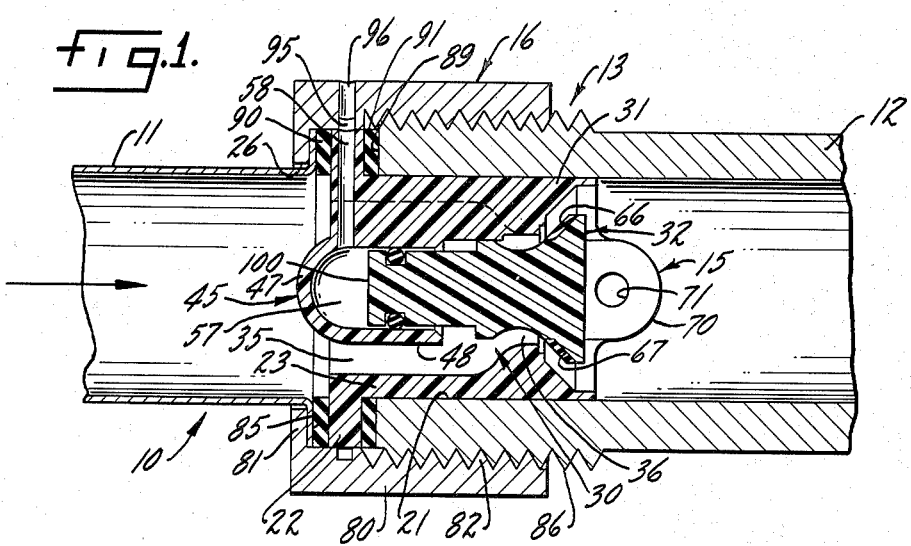
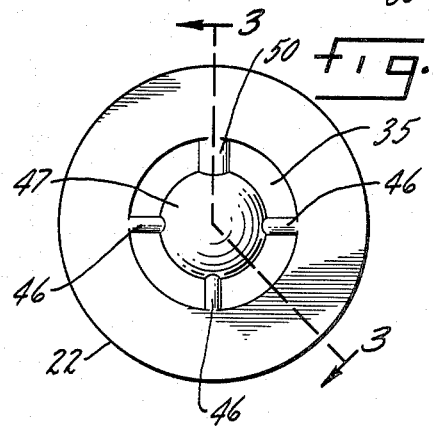
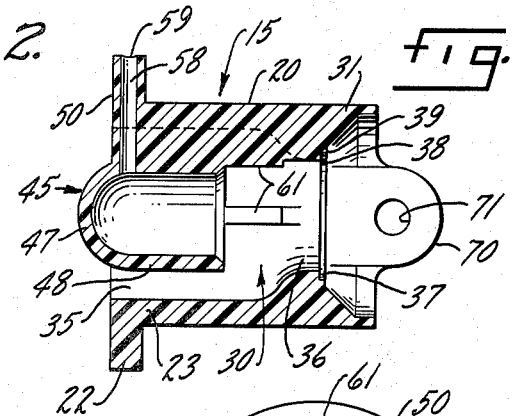
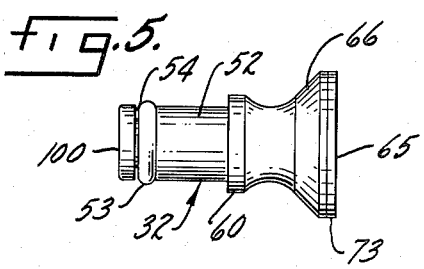
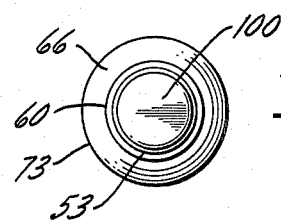
INVENTORS.
JAMES E. HIERS
RUSSELL E. TYRRELL
BY
Hume, Groen, Clement & Hume
Attorneys.

3,233,626
PRESSURE CONTROL
James E. Hiers and Russell E. Tyrrell, St. Paul, Minn., assignors to Union Tank Car Company, Chicago, Ill., a corporation of New Jersey
Filed Apr. 30, 1964, Ser. No. 363,794
10 Claims. (Cl. 137—494)

This invention relates in general to fluid pressure regulation, and more particularly to fluid pressure reduction in a fluid service line or the like.

It is an object of the present invention to provide a pressure reducer valve arrangement for incorporation in a fluid service line or the like.

It is another object to provide a pressure reducer valve arrangement including an improved valve assembly and mounting assembly.

It is still another object to provide a pressure reducer valve assembly which more effectively maintains a prescribed pressure reduction regardless of fluid pressure variation downstream of the assembly in a fluid service line or the like.

It is a further object to provide a simple, inexpensive pressure reducer valve assembly which is unitary in construction and can readily be inserted between sections of a fluid service line at a joint.

It is still a further object to provide a mounting assembly for expeditiously mounting the valve assembly in a fluid service line.

The foregoing and other objects are realized in accord with the present invention by providing a pressure reducer valve and mounting assembly having a minimum number of component parts which cooperate with pipe ends, for example, at a service line joint to seat in the service line. Pressure responsive area relationships in the valve assembly automatically and consistently effect a predetermined pressure drop from upstream to downstream of the valve assembly in the service line, regardless of variations in the demand for fluid downstream.

The invention, both as to its organization and method of operation, taken with further objects and advantages thereof, will best be understood by reference to the following description taken in connection with the accompanying drawings, in which:

FIGURE 1 is a sectional view through a pressure reducer valve and mounting assembly embodying features of the present invention and associated with a water service line;

FIGURE 2 is an upstream end elevational view of the valve assembly illustrated in FIGURE 1;

FIGURE 3 is a sectional view taken along line 3—3 of FIGURE 2;

FIGURE 4 is a downstream end elevational view of the valve assembly;

FIGURE 5 is a side-elevational view of the valve core for the valve assembly embodying features of the present invention; and FIGURE 6 is an upstream end elevational view of the valve core illustrated in FIGURE 5.

Referring now to the drawings, and particularly to FIGURE 1, a valve arrangement embodying features of the present invention is illustrated generally at 10. The valve arrangement 10 is disposed between an upstream section 11 and a downstream section 12 of the conventional water service line 13 to a water conditioning system (not shown) or the like. In the present instance the upstream section 11 is a conventional thin wall pipe while the downstream section is the inlet fitting for a control valve in the system. The valve arrangement 10 includes a valve assembly 15 and its mounting assembly 16.

The valve assembly 15 is constructed and arranged according to the present invention to automatically effect a prescribed pressure reduction from water pressure in the upstream line section 11 to the downstream line section 12 regardless of variations in the demand for water at various outlets (not shown) from the downstream section. Where, as illustrated, the service line 13 functions as a supply line for a water conditioning system and a constant inlet water pressure is available in the upstream line section 11, it is highly desirable to maintain a constant pressure at the control valve (not shown) downstream of the valve assembly 15 regardless of variations in the water volume demand at the control valve. The valve assembly 15 automatically provides a downstream pressure which is a prescribed ratio of the upstream pressure and maintains this ratio at all times.

The valve assembly 15 is mounted between the upstream line section 11 and the downstream line section 12 by the mounting assembly 16, as has been pointed out. The valve assembly 15 and its mounting assembly 16 cooperate to facilitate expeditious and simple insertion and removal of the valve assembly to and from the service line 13.

The valve assembly 15 includes a generally cylindrical plastic body 20 which is inserted into the open end 21 of the downstream line section 12. The plastic body has an outside diameter slightly smaller than the inside diameter of the line section 12 to accommodate insertion. An annular shoulder 22 on the upstream end 23 of the valve 20 cooperates with the mounting assembly 16 to mount the valve assembly 15 between the open end 21 of the downstream line section 12 and its counterpart on the upstream line section 11, the open end 26.

The valve bodly 20 has an axially disposed valve bore 30 extending through it from its upstream end 23 to its downstream end 31. A valve core 32 is mounted in the bore 30 for axial movement under the influence of the pressure relationship between the upstream line section 11 and the downsteram line section 12. Pre-established pressure responsive area relationships in the bore 30 and on the core 32 effect a prescribed pressure reduction from the upstream line section 11 to the downstream line section 12. In the present instance this prescribed pressure reduction amounts to forty percent. In other words, a water pressure of 100 p.s.i. in the upstream line section 11 would reduced to sixty p.s.i. in the line section 12 by the assembly 15.

The bore 30 includes an enlarged inlet throat 35 which narrows to a constricted port 36 defined by an annular valve bore seat 37 facing downstream. The valve seat 37 includes an inner seat edge 38 and an outer seat edge 39 which cooperate with the core 32 to provide a dual sealing effect. As will hereinafter be discussed in detail, it is the cross sectional area of the port 37 which defines one critical area significant to establishing the necessary pressure responsive area relationship within the valve assembly 15 for a desired pressure reduction.

Mounted in the enlarged inlet throat 35 of the bore 30 is a cylindrical housing 45. The housing 45 is a generally bullet-shaped plastic structure mounted in the bore 30 on four plastic ribs 46 extending between the outer periphery of the housing and the inner periphery of the inlet throat 35. The housing 45 has a segmentally spherical closed end 47 presenting a streamline configuration to the passage of water through the bore 30, and a cylinder 48 extending away from the closed end.

The core 32 is slidable in the cylinder 48 and, to this end, includes a piston 52. The piston 52 is very slightly smaller in diameter than the cylinder 48 and slides in the cylinder in fluid tight relationship afforded by an O-ring 53 seated in an O-ring seat 54 formed in the piston. The cross sectional area of the piston 52 defines a second critical area significant to establishing the pressure responsive area relationships determinative of a prescribed pressure reduction.

As will be recognized, a chamber 57 is formed in the cylinder 48 between its closed end 47 and the piston 52. The chamber 57 is vented to the atmosphere so that the piston 52 moves easily in the cylinder 48. Venting is accomplished through a vent passage 58 formed in the cylinder 48, an enlarged rib 50 of the aforedescribed ribs 46 (see FIGURE 2), and the annular shoulder 22. The mounting assembly 16 affords the outer end 59 of the passage 58 access to the atmosphere in a manner hereinafter discussed.

Immediately adjacent the cylindrical piston 52 on the core 32 is an annular shoulder 60 which guides the core 32 in sliding movement within the bore 30. The shoulder 60 rides in engagement with the guide surfaces 61 formed on the inner periphery of the ribs 46 (and 50). It will be noted that the guide surfaces 61 extend from a point immediately adjacent the cylinder 48 to a point immediately adjacent the port 36.

The downstream end 65 of the core 32 is bell-shaped and has a frusto-conical valve core seat 66 mounted on it facing the valve bore seat 37. The valve core seat 66 is formed of rubber or the like suitably bonded in a frusto-conical relief 67 on the downstream end 65 of the core 32. The valve core seat 66 is arranged to engage the valve bore seat 37 in sealing relationship.

To prevent the core 32 from sliding out of the valve bore 30 during operation, a pair of retaining ears 70 are formed in opposed relationship on the downstream end 31 of the valve body 20. The retaining ears 70 have apertures 71 formed thereon for receiving a core retaining pin (not shown). In practice, however, with the line pressures normally encountered, the pin (not shown) can be eliminated because the ears 70 are spaced so that their arcuate inner surfaces 72 establish an interference fit with the periphery 73 of the downstream end 65 on the core 32. Consequently, the core 32 can be manually forced past the inner surfaces 72 of the ears 70 into the bore 30 but cannot be forced outwardly of them by pressures in the range which the valve assembly 15 normally operates.

As has been pointed out, the valve body 20 is retained between the open ends 26 and 21 of the upstream and downstream line sections 11 and 12, respectively, by the mounting assembly 16. The mounting assembly 16 includes a collar 80 which has an inwardly extending flange 81 formed on one end and an internal set of threads 82 formed in its opposite end. The flange overlies a lip 85 formed outwardly on the open end 26 of the upstream line section 11 while the internal threads 82 of the collar 80 are threaded onto external threads 86 formed on the open end 21 of the downstream line section 12.

The shoulder 22 of the valve body 20 is retained between the lip 85 and an annular planar surface 89 formed on the free end 21 of the downstream line section 12 by screwing the collar 80 down against fluid tight annular gaskets 90 and 91. The gasket 90 seats between the lip 85 and the shoulder 22 on the valve body 20 while the gasket 91 seats between the shoulder 22 and the annular planar surface 89 on the downstream line section 12. The collar 80 has a circumferentially extending internal relief 95 formed in it for axial alignment with the vent passage 58 to the chamber 57 in the valve body 30. Radially extending apertures 96 through the collar 80 connect the relief 95 and accordingly, the chamber 57 to the atmosphere.

Turning to the operation of the valve assembly 15, it has been pointed out that the two areas significant to a prescribed pressure reduction are (1) the cross-sectional areas of the port 36 in the bore 30, and (2) the cross-sectional area of the piston 52 on the core 32. To illustrate the establishment of a prescribed pressure reduction as water passes through the valve assembly 15 embodying features of the present invention, the cross-sectional area of the piston 52 (or the surface area of its flat end 100) is designated $A_1$. The cross-sectional area of the port 36 in the bore 30 is designated $A_2$. If the service line pressure in the upstream line section 11 is $P_1$ then the resultant pressure in the downstream line section 12 is $P_2$ according to the following formula:

$$P_1A_2 + P_2A_2 \geq P_1A_2$$

Hypothesizing an inlet pressure of 100 p.s.i. and desiring a consistent outlet pressure of 60 p.s.i., for example, it is easy to design a valve which will give the prescribed pressure reduction. For example, $A_1 = 0.5$ sq. in. then: $100 \times 0.5 = 100\ A_2 - 60\ A_2$, and $A_2 = 1.25$ in. sq.

To vary the prescribed pressure reduction, it is merely necessary to vary one or both of the aforedescribed areas $A_1$ and $A_2$.

It will now be recognized that a simple and inexpensive valve arrangement 10 has been described which can readily be constructed to automatically provide a prescribed pressure reduction in a water service line, for example. No subsequent adjustment of its valve assembly 15 is necessary, and its mounting assembly 16 assures expeditious insertion and removal to and from a simple joint in the service line. In this light, it should be pointed out that although the valve arrangement 10 is described in the context of a water system, it might be utilized in any liquid conduit system wherein a constant reduction in pressure in a service line or the like is desirable.

While the embodiment described herein is at present considered to be preferred, it is understood that various modifications and improvements may be made therein, and it is intended to cover in the appended claims all such modifications and improvements as fall within the true spirit and scope of the invention.

What is claimed is:

1. In a pressure fluid line including an upstream line section and a downstream line section having free ends, a pressure reducer valve arrangement for automatically reducing fluid pressure from said upstream line section to said downstream line section by a prescribed ratio, comprising; a valve body extending into the downstream line section, a shoulder on said valve body disposed between the adajcent free ends of the line sections, collar means for drawing the line sections and said rim together in fluid-tight relationship, a valve bore extending through said body, an annular valve seat formed in said bore and defining a valve port having a predetermined cross-sectional area $A_2$, a cylinder formed in said bore, a valve core in said bore including a piston having a predetermined cross-sectional area $A_1$ and slidable in said cylinder whereby a chamber is formed in said cylinder above said piston, means venting said chamber to the atmosphere, an annular valve seat on said core for seating against said bore valve seat, the ratio of fluid pressure $P_1$ upstream of said port to fluid pressure $P_2$ downstream of said port being defined by the formula $P_1A_1 + P_2A_2 \geq P_1A_2$.

2. The pressure reducer valve arrangement of claim 1 further characterized in that said valve body is substantially cylindrical in cross section and fits substantially snugly into the downstream line section of the pressure fluid line.

3. The pressure reduced valve arrangement of claim 2 further characterized in that said collar means includes a flange for gripping one of the line sections and an internally threaded portion for gripping the other of said line sections.

4. In a pressure fluid line including an upstream line section and a downstream line section having adjacent free ends, a pressure reducer valve arrangement for automatically reducing fluid pressure from said upstream line section to said downstream line section by a prescribed ratio, comprising: a substantially cylindrical valve body extending into the downstream line section, an annular shoulder on said valve body disposed between the adjacent free ends of the line sections, collar means for drawing the line sections and said rim together in fluid tight relationship, a valve bore extending through said body, an annular valve seat formed in said bore and defining a valve port having a predetermined cross-sectional area $A_2$, a cylinder mounted in said bore on a plurality of ribs, a valve core in said bore including a piston having a predetermined cross-sectional area $A_1$ and slidable in said cylinder whereby a chamber is formed in said cylinder above said piston, means extending through at least one of said ribs, said annular shoulder, and said collar means to vent said chamber to the atmosphere, an annular valve seat on said core for seating against said bore valve seat, the ratio of fluid pressure $P_1$ upstream of said port to fluid pressure $P_2$ downstream of said port being defined by the formula $P_1A_1+P_2A_2 \geq P_1A_2$.

5. The pressure reducer valve arrangement of claim 4 further characterized in that said vent means comprises a vent passage extending through one of said ribs and said annular shoulder, said vent means in said collar means communicating with said vent passage regardless of the rotational position of said collar means about the axis of the fluid line.

6. In a fluid pressure line including an upstream line section and a downstream line section having adjacent free ends where one of the free ends has a radially extending lip formed thereon and the other of the free ends has an annular substantially flat surface formed thereon, a pressure reducer valve arrangement for automatically reducing fluid pressure from the upstream line section to the downstream line section by a prescribed ratio, comprising: a substantially cylindrical valve body extending into the downstream line section, a shoulder on said valve body disposed between said lip and said annular flat surface, gasket means bracketing said shoulder, collar means for drawing the lip and said flat surface together against said gasket means and said rim in fluid tight relationship, a valve bore extending through said body, an annular valve seat formed in said bore and defining a valve port having a predetermined cross sectional area $A_2$, a cylinder formed in said bore, a valve core in said bore including a piston having a predetermined cross-sectional area $A_1$ and slidable in said cylinder whereby a chamber is formed in said cylinder above said piston, means extending through said shoulder and said collar means to vent said chamber to the atmosphere, an annular valve seat on said core for seating against said bore valve seat, the ratio of fluid pressure $P_1$ upstream of said port to fluid pressure $P_2$ downstream of said port being defined by the formula $$P_1A_1+P_2A_2 \geq P_1A_2$$

7. A pressure reducer valve assembly for seating between adjacent free ends of an upstream line section and a downstream line section in a fluid pressure line, comprising: a valve body adapted to extend into the downstream line section, a shoulder on said valve body adapted to be retained between the adjacent free ends of the line sections, a valve bore extending through said body, an annular valve seat formed in said bore and defining a valve port having a predetermined cross sectional area $A_2$, a cylinder formed in said bore, a valve core in said bore including a piston having a predetermined cross sectional area $A_1$ and slidable in said cylinder whereby a chamber is formed in said cylinder above said piston, means venting said chamber to the atmosphere, an annular valve seat on said core for seating against said bore valve seat, the ratio of fluid pressure $P_1$ upstream of said port to fluid pressure $P_2$ downstream of said port being defined by the formula $P_1A_1+P_2A_2 \geq P_1A_2$.

8. The pressure reducer valve assembly of claim 7 further characterized in that said cylinder has a substantially bullet-shaped head and is supported on rib means on said bore, said vent means extending through said rib means.

9. A pressure reducer valve assembly for seating between the adjacent free ends of an upstream line section and a downstream line section in a pressure fluid line, comprising: a substantially cylindrical valve body adapted to extend into the downstream line section, an annular shoulder on said valve body adapted to be retained between the adjacent free ends of the line sections, a valve bore extending through said body, an annular valve seat formed in said body facing downstream and defining a valve port having a predetermined cross-sectional area $A_2$, a cylinder mounted in said bore upstream of said valve seat, a valve core in said bore including a piston having a predetermined cross sectional area $A_1$ and slidable in said cylinder whereby a chamber is formed in said cylinder above said piston, means venting said chamber to the atmosphere, an annular valve seat on said core facing upstream for seating against said bore valve seat, the ratio of fluid pressure $P_1$ upstream of said port to fluid pressure $P_2$ downstream of said port being defined by the formula $$P_1A_1+P_2A_2 \geq P_1A_2$$

10. The pressure reducer valve arrangement of claim 9 further characterized in that said cylinder is substantially bullet-shaped in configuration and mounted on a plurality of radially disposed ribs in said bore, said vent means extending through one of said ribs and said shoulder.

References Cited by the Examiner
UNITED STATES PATENTS

| | | | |
|---|---|---|---|
| 457,056 | 8/1891 | McNeil et al. | 137—494 |
| 966,390 | 8/1910 | Elder | 137—515.7 |
| 3,108,611 | 10/1963 | Ketler | 137—494 |

M. CARY NELSON, *Primary Examiner.*

UNITED STATES PATENT OFFICE
CERTIFICATE OF CORRECTION

Patent No. 3,233,626　　　　　　　　　　　　　　February 8, 1966

James E. Hiers et al.

It is hereby certified that error appears in the above numbered patent requiring correction and that the said Letters Patent should read as corrected below.

Column 4, line 40, after "having" insert -- adjacent --.

Signed and sealed this 17th day of January 1967.

(SEAL)
Attest:

ERNEST W. SWIDER
Attesting Officer

EDWARD J. BRENNER
Commissioner of Patents